United States Patent
Bak et al.

(10) Patent No.: US 7,632,068 B2
(45) Date of Patent: Dec. 15, 2009

(54) CONTROL OF POWER, LOADS AND/OR STABILITY OF A HORIZONTAL AXIS WIND TURBINE BY USE OF VARIABLE BLADE GEOMETRY CONTROL

(75) Inventors: Dan Christian Bak, Lyngby (DK); Thomas Buhl, Greve (DK); Peter Fuglsang, Roskilde (DK); Helge Aagaard Madsen, Kr. Sáby (DK); Flemming Rasmussen, Holeby (DK)

(73) Assignee: Technical University of Denmark, Lyngby (DK)

( * ) Notice: Subject to any disclaimer, the term of this patent is extended or adjusted under 35 U.S.C. 154(b) by 514 days.

(21) Appl. No.: 10/551,406

(22) PCT Filed: Mar. 31, 2004

(86) PCT No.: PCT/DK2004/000225

§ 371 (c)(1), (2), (4) Date: Jul. 21, 2006

(87) PCT Pub. No.: WO2004/088130

PCT Pub. Date: Oct. 14, 2004

(65) Prior Publication Data

US 2007/0036653 A1 Feb. 15, 2007

(30) Foreign Application Priority Data

Mar. 31, 2003 (DK) .............................. 2003-00491

(51) Int. Cl.
F03B 3/14 (2006.01)
(52) U.S. Cl. ..................................... 416/23; 416/132 B

(58) Field of Classification Search .................. 416/23, 416/24, 132 B; 244/44, 5
See application file for complete search history.

(56) References Cited

U.S. PATENT DOCUMENTS

| 2,333,482 | A  | 11/1943 | Littman |
| 5,224,826 | A  | 7/1993  | Hall et al. |
| 6,213,433 | B1 | 4/2001  | Brase, Jr. et al. |
| 6,419,187 | B1 | 7/2002  | Buter et al. |

FOREIGN PATENT DOCUMENTS

GB 2 308 836 A 7/1997

(Continued)

OTHER PUBLICATIONS

Amir S. Mikhail et al., "The Zond 550 κW Z-40 Wind Turbine Development Status and Test Results", Sed-vol. 16, Wind Energy—1995, Abstract.

(Continued)

*Primary Examiner*—Edward Look
*Assistant Examiner*—Dwayne J White
(74) *Attorney, Agent, or Firm*—Stephen A. Bent; Foley & Lardner LLP

(57) ABSTRACT

The present invention relates to a design concept by which the power, loads and/or stability of a wind turbine may be controlled by typically fast variation of the geometry of the blades using active geometry control (e.g. smart materials or by embedded mechanical actuators), or using passive geometry control (e.g. changes arising from loading and/or deformation of the blade) or by a combination of the two methods. The invention relates in particular to a wind turbine blade, a wind turbine and a method of controlling a wind turbine.

18 Claims, 5 Drawing Sheets

FOREIGN PATENT DOCUMENTS

WO    WO 01/14740  A1    8/2000
WO    WO 01/98654  A1    6/2001

OTHER PUBLICATIONS

L Scott Miller et al., "An Evaluation of Several Wind Turbine Trailing-Edge Aerodynamic Brakes", Sed-vol. 16, Wind Energy—1995, pp. 197-209.

Dora T. Yen et al., "Active Load Control for Wind Turbina Blades Using Mem Translation Tabs", Proc. 2001 ASME Wind Energy Symposium, $39^{th}$ AIAA Aerospace Sciences Meeting and Exhibit, Reno, Nevada, Jan. 11-14, 2001, pp. 114-122.

Ori Levin et al., "Optimization of a Low Reynolds Number Airfoil with Flexible Membrane", CMES, vol. 2, no. 4, 2001, pp. 523-536.

Daniel G. Murri et al., "Wind-Tunnel Investigation of a Full-Scale General Aviation Airplane Equipped with an Advanced Natural Laminar Flow Wing", NASA Technical Paper 2772, 1987, pp. 1-133.

CONTROL OF POWER, LOADS AND/OR STABILITY OF A HORIZONTAL AXIS WIND TURBINE BY USE OF VARIABLE BLADE GEOMETRY CONTROL

Preferred embodiments of the present invention relates to a design concept by which the power, loads and/or stability of a wind turbine may be controlled by typically fast variation of the geometry of the blades using active geometry control (e.g. smart materials or by embedded mechanical actuators), or using passive geometry control (e.g. changes arising from loading and/or deformation of the blade) or by a combination of the two methods. The invention relates in particular to a wind turbine blade, a wind turbine and a method of controlling a wind turbine.

BACKGROUND OF THE INVENTION

Almost all large wind turbines build today have pitch bearings at the blade root so that the pitch of the whole blade can easily be changed by activating the pitch mechanism. Pitching of the blade is used as a brake to stop the rotor but it is also used for power and load control in different ways. On active stall controlled turbines a relative slow variation of the pitch of the blades is used to adjust the pitch so that stall on the blade occurs at the right maximum power, but the pitch system is also active at low wind speed to maximise the power. On pitch controlled wind turbines the pitch at high wind is changed continuously, so that the maximum power is not exceeded. This is done by reducing the inflow angle to the blade when the wind speed is increasing. The pitch system is also used at low wind speeds to maximise the power.

Recently, new types of pitch regulated wind turbines also use the pitch system to reduce the dynamic loads, either by cyclic pitch or by individual blade pitch. Different input signals to the control system as e.g. the flapwise loading can be used.

Apart from this state-of-the-art control with blade pitching, control of power and loads by movable, small control surfaces have been proposed [2]. A 550 kW turbine designed by ZOND in USA used a partial span aileron system for control of power and rotor rotational speed, [1]. The aileron system is similar to trailing-edge flaps for aeroplanes. Gurney flaps attached to the trailing edge of the blades have as well been proposed and analysed [3] (cf. FIG. 1 of [3]). The advantage of a small control surface is a possible faster response due to less inertia than if the whole blade is being pitched. One disadvantage of Gurney flaps is however the increase in aerodynamic noise from the free ends of the Gurney flaps and from the gaps in the blade where the Gurney flap is positioned.

Within the aviation industry leading-edge droop and trailing-edge flap have been investigated and used. Examples of airfoil characteristics obtained by such devices are shown in [5] being exemplified in FIG. 2 and FIG. 3. It is the variation of the same effects that are desired with this new invention. Also, the aerodynamics of micro-air-vehicles have been investigated, where flexible airfoils have been proposed, [4].

SUMMARY OF THE INVENTION

It is envisaged, that the invention may render it possible to control the aerodynamic forces substantially instantaneously and locally along the blades of a wind turbine rotor by continuous variation of the airfoil geometry in the leading edge region and trailing edge region along part of or along the whole blade span. In preferred embodiments, this is enabled by a blade structure consisting of a stiff load carrying part in the central part of the airfoil and a deformable leading edge region and/or trailing edge region. The connection between the load carrying part and the deformable part should preferably be continuous, i.e. (there should be no edges, which can result in generation of noise).

Thus, in a first aspect the present invention preferably relates to a wind turbine blade comprising
  one or more shape deformable airfoils sections wherein the outer surface of each of the shape deformable airfoils sections is substantial continuos in all of its shapes, and
  actuator means for providing the shape changes in the shape deformable airfoil sections.

It is noted that the most downstream point of the trailing edge itself may constitute a discontinuity and this discontinuity may remain during and after deformation of the deformable airfoils sections. Additionally, the feature "continues" when used in connection with a shape of for instance a blade may preferably, but not, solely, be construed as meaning a shape which do not spoil the flow, such as generates separations in the flow, past the contour or surface. A contour or surface of an airfoil section or blade is preferably, but not solely, considered to be continuos if it has first, second and optionally third derivatives being smooth and continues. Furthermore, the invention is disclosed with reference to wind turbine blades but it is envisaged that the invention may be applied to other lifting bodies such as aircraft wings or the like.

The terms leading edge region and trailing edge region as used herein refer preferably, but not solely to a region which chord wise extension is in the range of 20-30% of the chord length, such as in the range of 10-20% of the chord length.

An example of a design based on the invention is the use of smart materials or by mechanical actuators integrated in a deformable materiel changing the outer geometry in the leading and trailing edge region and thereby changing the blade section aerodynamic forces.

In the following the term smart material is used. Within the meaning of this term is a material that deforms once a voltage is applied to it, such as the preferred material being an active piezoelectric composite. However, other materials which deformations can be controlled actively are applicable and preferred in connection with the present invention.

Smart materials may be achieved by using the properties of a single material or by combining the properties and functions of a number of components to make up the smart material. A particularly preferred field is the field of Micro-Electro Mechanical Systems (MEMS). Utilising the mechanical, thermal, electrical, chemical, biological and/or optical functionality of materials is used to add smartness to preferred embodiments. Preferred materials include: shape memory alloys, piezoelectric materials, magnetostrictive materials, electrorheological fluids, electrochromic materials, electroactive polymers, chiral materials, conducting polymers, photoactive materials, thick and thin films, optical fibres, tunable dielectrics, self monitoring materials, self assembly materials, self repairing/healing materials, biomaterials, power supplies, power sources, and self powering, multilayer and composite materials and/or smart composites.

The actuation of the deformable parts of the airfoil is controlled either actively, passively or a combination thereof. The active control involves preferably a wind turbine control system monitoring loads, vibrations and/or stability, preferably by blade inflow measurements, flow pressures, strain gauges and accelerometers on different components providing input signals for the smart materials or actuators which then almost instantaneously change the geometry of the airfoil sections and thereby the aerodynamic forces. The passive control comprises preferably changes in the geometry obtained from influence of blade deformation, e.g. a change in effective camber from blade flapwise bending or from pressure fluctuations from the interaction with the flow.

Preferred embodiments of the invention have been found capable of reducing the dynamic loading from shear in the mean inflow, from turbulence in the inflow and from dynamic loading arising from the eigen motion of the blades by control of the instantaneous aerodynamic forces along the blade. Also loads from tower influence may be substantially reduced. Preferred embodiments of the invention may also make it possible to reduce the aerodynamic noise by reducing the dynamic pressure variations over the airfoil, e.g. in the case of a blade passing through the wake of a tower.

The use of the variable blade geometry concept can be combined with full span pitch control. e.g. for use at blade start and stop, for regulation of power and loads as function of mean wind speed and for reduction of loads at extreme wind speeds at rotor standstill.

It is envisaged, that preferred embodiments according to the present invention may provide one or more of the following advantages:
- full continuity of blade surface during control actions, which will enable low aerodynamic noise and high aerodynamic efficiency
- fast response possible as deformable materials can be made with low density and flexible materials as they are not carrying the main blade loads
- different control actions along the blade is possible which e.g. can be used to reduce dynamic loads and suppress vibrations in different blade modes and thus improve the stability of the wind turbine
- easier transportation of the blades as the deformable geometry parts of the blades can be mounted at the final site In preferred embodiments of the wind turbine blade the actuator means may be active means in the sense that they(it) provide(s) changes in shape by supplying them(it) with energy in contrary to designs where the external forces acting on the blades provide shape changes. In particular preferred embodiments, each shape deformable airfoil section comprising a substantially non-deformable part and one or more deformable parts.

The outer surface of at least one of the deformable parts may preferably be defined by a skin made of a flexible material, e.g. rubber and in such embodiments at least one of the deformable parts may preferably be a shell construction in which the skin defines the shell. Additionally, the interior of the shell construction may be occupied by a deformable supporting material, such as a foam made of plastic or rubber.

It is in general preferred that the transition between the outer surface of substantially non-deformable part and the skin of the deformable parts is substantially smooth, such as substantial continuous.

In preferred embodiments, the non-deformable part may comprise abutment surfaces on which the skin abuts and the abutment surfaces is preferably shaped so that the transition between the outer surface of the substantial non-deformable part and the skin is substantially smooth, such as substantial continuous. The abutment surfaces may in preferred embodiments be provided on a structure connected to the non-deformable part.

The actuator means may in many preferred embodiments acts(act) on the inner side of the skin.

The actuator means may in many preferred embodiments be a longitudinally extendable device(s), preferably being a hydraulic device, having one end connected to the skin and the other end connected to the substantially non-deformable part or a structure connected to the substantially non-deformable part. Furthermore, the longitudinal extendable device is in many preferred embodiments attached at one end in the vicinity of either the upper or lower side of the airfoil.

The longitudinal extendable device(s) may preferably extend mainly in the cordwice direction. The end being connected to the skin is preferably connected to the skin at the lower side of the airfoil and the end being connected to the substantially non-deformable part or the structure is preferably connected in the vicinity of the upper side of the airfoil or vice versa.

In particular preferred embodiment, the longitudinal extendable device(s) is(are) an extendable piston device.

The skin may in many preferred embodiments be attached to the substantially non-deformable part and the actuator means may preferably be situated within the skin. The actuator means may preferably be material composition(s) which elongation(s), shortening(s) and/or bending(s) is(are) controllable by applied electrical current(s), e.g. being a smart material. Furthermore, the material composition may be sandwiched or embedded in the skin, preferably in such a manner that no slip between the material composition and the material of the skin occurs during deformation of the skin. Alternatively or in combination therewith, the material composition may be applied to the interior surface of the skin, preferably in such a manner that no slip between the material composition and the material of the skin occurs during deformation of the skin.

In many particular preferred embodiments, at least one of the shape deformable parts may be made of flexible material(s), e.g. rubber, and wherein the actuator means may be an extendable beam(s) extending within the material(s). Additionally, the at least one deformable part may preferably be made solely of flexible material(s) having one or more voids.

The extendable beam(s) may preferably be made from a material composition which elongation(s), shortening(s) and/or bending(s) is(are) controllable by applied electrical current(s), such as made from a smart material.

In accordance with preferred embodiments according to the present invention, the actuator means may be passive in the sense that they provide(s) changes in shape as a result of movement of the blade, said movement being preferably torsion, bending and/or rotation of the blades. The movement of the blade is typically introduced by the windforces acting on the blade.

In many particular preferred embodiments, the substantially non-deformable part may be a central part of the blade and the one or more deformable parts may be the leading edge region and/or the trailing edge region. The substantially non-deformable part may very advantageously be a load carrying part of the blade.

In another aspect the present invention relates to a method of controlling the operation condition(s) of a wind turbine comprising one or more blades each having one or more shape deformable airfoil sections, said operation condition(s) being preferably the load on the blade(s), the power produced by the wind turbine, air induced noise, the stability of the wind turbine and/or the like. The method comprises preferably the step of controlling the shape of the shape deformable airfoil sections, wherein the changes in shape are preferably performed so that no discontinuities are introduced in the surfaces of the airfoils sections.

Preferably, each or some of the shape deformable airfoil sections comprise one or more of the features according to the first aspect of the present invention.

The wind turbine may preferably comprises detecting means for detecting the one or more operation(s) conditions, wherein the detected operation condition(s) may be input to a computer system comprising functionality determining shape deformations to be imposed on some or all of the deformable airfoil sections based on said input.

Preferably, the detecting means may comprise means for measuring the blade flow pressure, the rotor position and/or strain gauges, accelerometers or the like, preferably provided on one or more components of the wind turbine, said components being typically and preferably the blade(s), the nacelle and/or the tower.

A typical time scale for a deformation to be introduced in the deformable airfoil sections, may preferably and advantageously be lower than the time for one rotor rotation, preferably lower than half the time for one rotor rotation, such as lower than one quarter for the time for one rotor rotation, such as lower than the time it takes for a blade to rotate 10°, such as 15°, which may be applicable to control deformations within a tower wake passage.

Additionally, the method according to the present invention may further comprise the step setting and/or altering the full span pitch of each blade.

An additional aspect of the present invention relates to a wind turbine having one or more wind turbine blades according to present invention. A further aspect relates to a wind turbine being controlled by the method according to the present invention.

BRIEF DESCRIPTION OF THE DRAWINGS

In the following the invention and in particular preferred embodiments thereof will be described in details with reference to the accompanying drawings in which.

The arrows show the shear-movement of the material and the corresponding movements of the trailing edge region.

DETAILED DESCRIPTION OF PREFERRED EMBODIMENTS OF THE INVENTION

Figure 1:
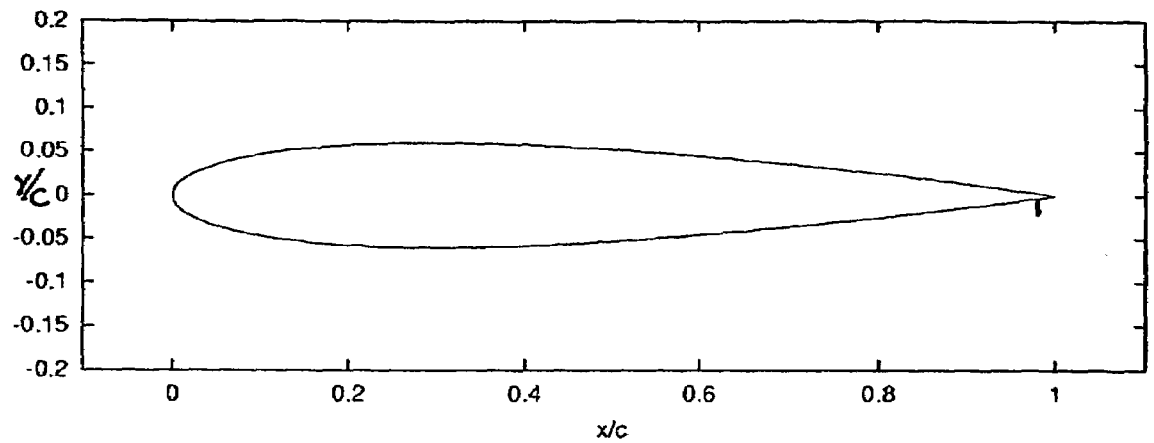
FIG. 1 shows a sketch of an airfoil with a movable Gurney flap positioned at the trailing edge.
Figure 2:
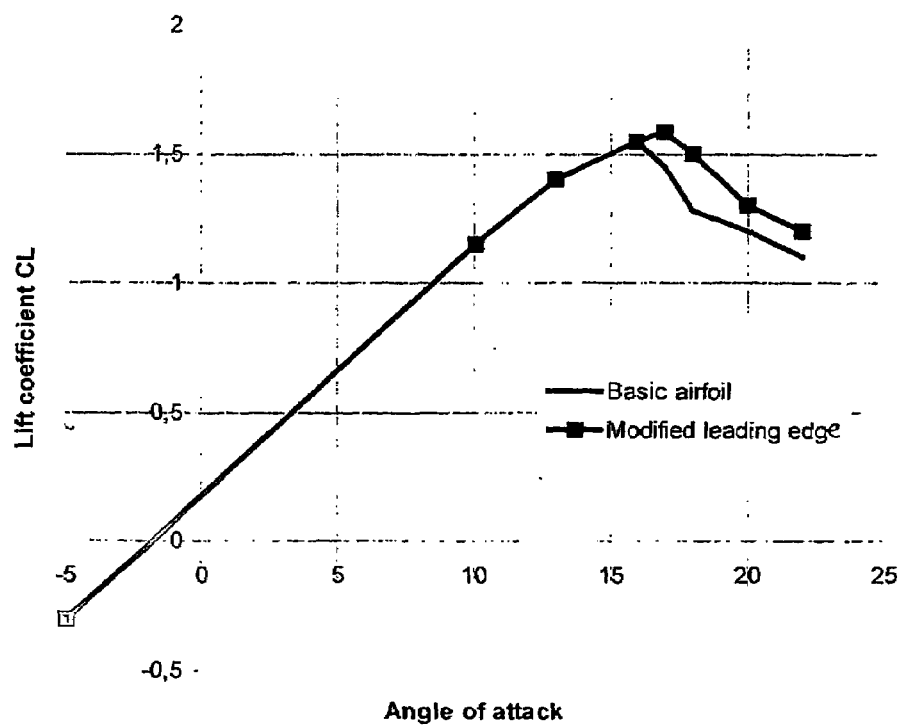
FIG. 2 shows schematically lift vs. angle-of-attack with and without a leading-edge droop (measurements corresponding to FIG. 2 may be found in e.g. [5])
Figure 3:
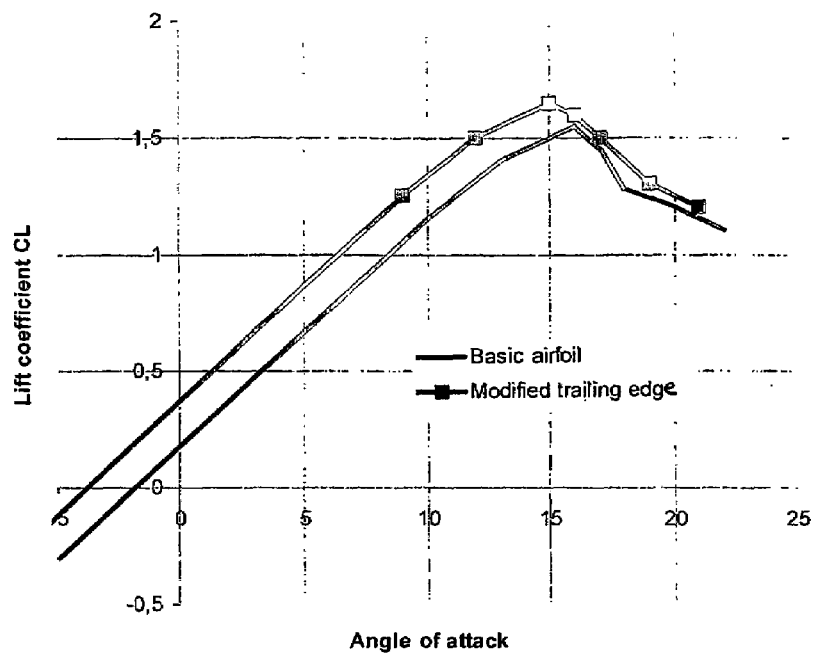
FIG. 3 shows lift vs. angle-of-attack with and without a trailing-edge flap (measurement corresponding to FIG. 2 may be found in e.g. [5])
Figure 4:
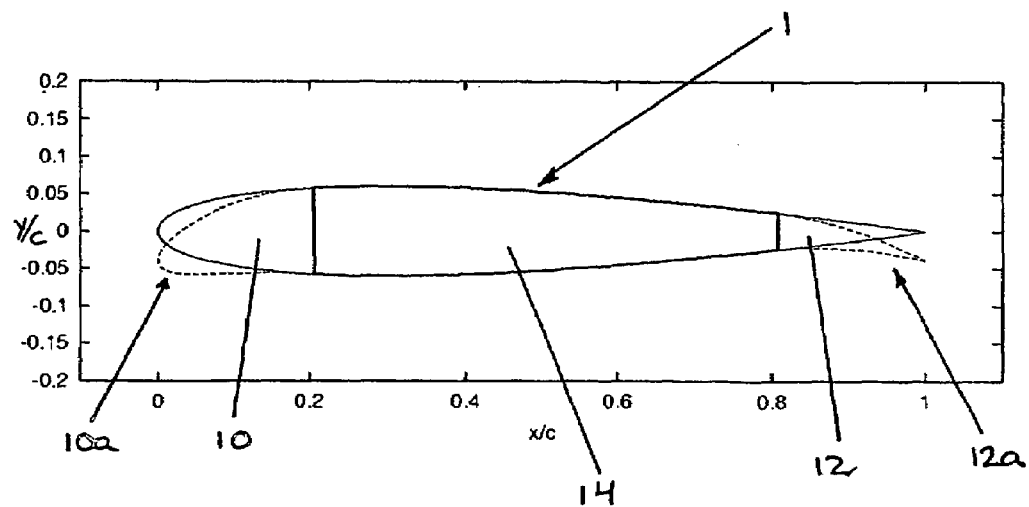
FIG. 4 shows a sketch of an airfoil according to preferred embodiments of the present invention with continuous curvature and deformable leading and trailing-edge region.

In FIG. 4 an airfoil section 1 having two deformable parts namely a deformable leading and trailing edge region is shown schematically. The airfoil section 1 has an initial shape indicated by solid lines where the leading edge region 10 and the trailing edge region 12 is non-deformed and a deformed shape indicated by dotted lines where the leading edge region and trailing edge region are deformed into the leading edge region and trailing edge region indicated by numerals 10a and 12a in FIG. 4. Furthermore, the airfoil section 1 comprises a non-deformable part 14 which is designed to carry the load produced by the airfoil section. As indicated in FIG. 4, the deformations of the airfoil section 1 does not introduce any discontinuities in the outer surface of the airfoil section 1 which remains smooth during and after deformation.

The wing may have deformable parts extending the entire span, which may be construed as the deformable section extending the whole wing, or the wing may have deformable parts locally along the span, thereby having a number of deformable sections arranged along the span. Furthermore, the wing may in some regions only have a deformable leading edge region or trailing edge region.

Figure 5:
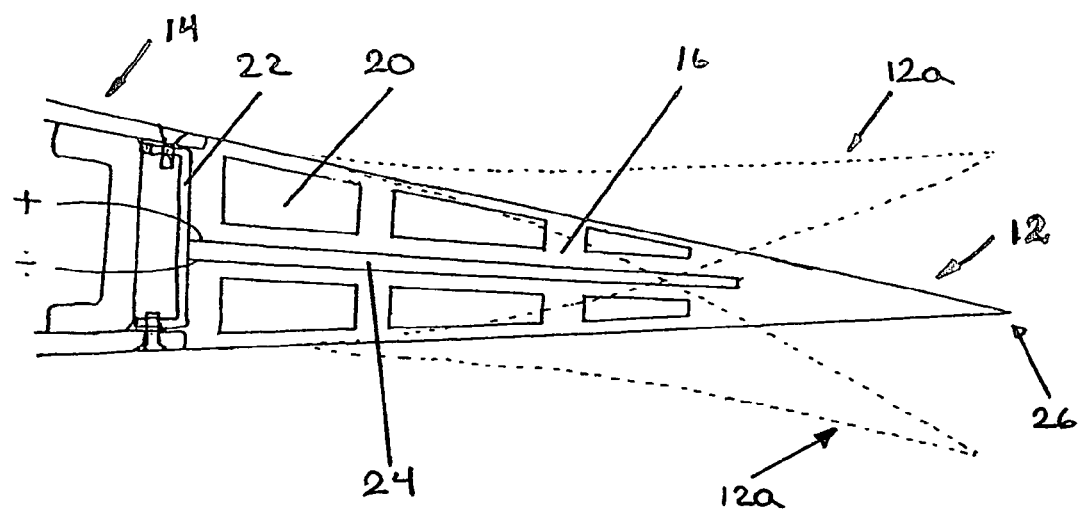
FIG. 5 shows a cross sectional view of an airfoil trailing edge region according to preferred embodiments of the present invention.

In FIG. 5, a cross sectional view of an airfoil trailing edge region 12 is shown. Again, solid lines indicate the initial shape of the trailing edge region 12 and the deformed shapes of the trailing edge region 12a are indicated by dotted lines. The deformable trailing edge region 12 is made of a flexible material, preferably rubber, having voids 20. The trailing edge region 12 comprises a construction 22 to which a beam 24 made of smart material is attached. The construction 22 is bolted to the non-deformable part 14 and the beam 24 extends in the longitudinal direction of the airfoil section 1 from the construction 22 and to the vicinity of the rear stagnation point 26 of the trailing edge region 12 as indicated in FIG. 5. When energizing the beam 24 of smart material by applying voltage to the material (as indicated by "+""÷" in FIG. 5), the beam will deflect upwardly or downwardly depending on the polarization of the voltage thereby resulting in a deformation of its initial shape (the shape of the trailing edge region where no voltage is applied to the beam).

Figure 6:
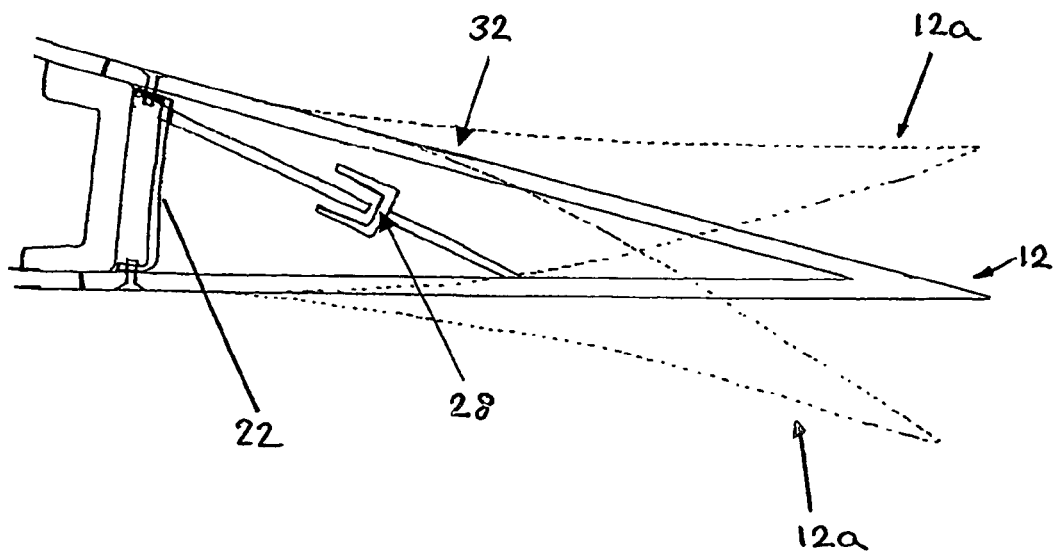
FIG. 6 shows a cross sectional view of an airfoil trailing edge region according to preferred embodiments of the present invention.

In FIG. 6, a cross sectional view of an airfoil trailing edge region is shown. In this embodiment, the trailing edge region 12 comprises a skin 32 of sufficient strength to resist the pressure from the surrounding fluid acting on the surface to avoid a deformation of the skin due to this pressure. The skin 32 is made of a flexible material (e.g. rubber) and is attached to the non-deformable part 14 by the construction 22. A piston assembly 28, such as a hydraulic piston arrangement, that can increase or decrease its longitudinal extension can actively control the movement of the trailing edge region controls the trailing edge region's deformation. The piston assembly 28 is at one of its distal ends attached to a structure 22 similar to the one shown in FIG. 5 at a position close to the upper side of the airfoil—or in general at a position above the cord line of the airfoil section. At the other distal end, the piston arrangement 28 is attached to the inner side of the lower side of the skin 32. Upon activation of the piston arrangement 28, e.g. elongation or shortening of the piston, the trailing edge region will deform into a deformed shape where either the trailing edge region is bend upwardly or downwardly. 12a in FIG. 6 indicate two such shapes. It is noted that a similar or even equal result may be obtained by attaching one of the distal ends of the piston assembly 28 to the structure 22 at a position close to the lower side of the airfoil, or in general below the chord line of the airfoil, and attaching the other distal end to inner side of the skin on the upper side of the airfoil. It is further noted that the piston assembly may be substituted by other longitudinal extendable devices, such as a rod made of smart material.

Figure 7:
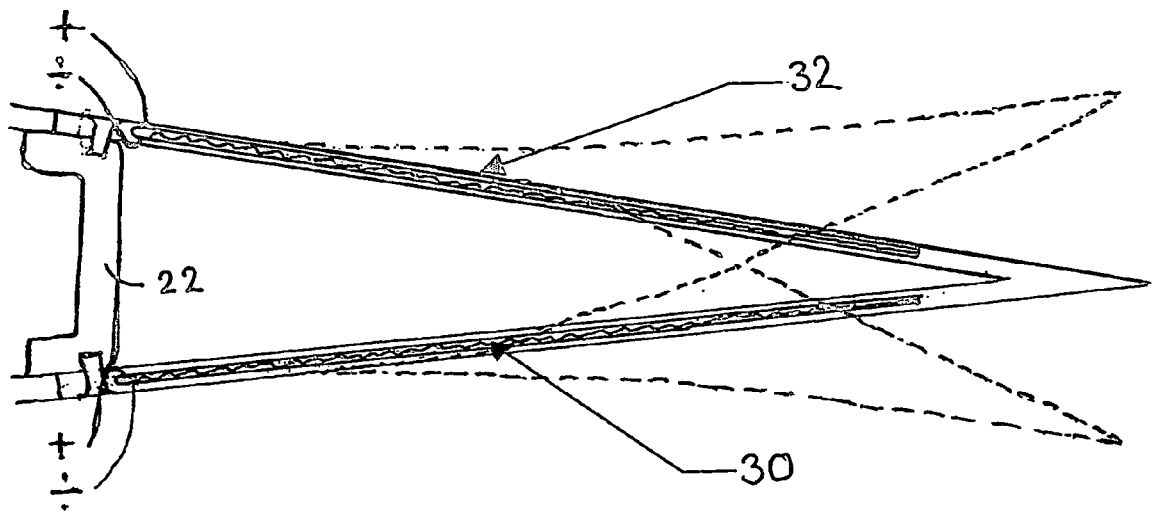
FIG. 7 shows a cross sectional view of an airfoil trailing edge region according to preferred embodiments of the present invention.

In FIG. 7 a cross sectional view of an airfoil trailing edge region is shown. The trailing edge region comprises a skin 32 similar to the skin 32 of the embodiment shown in FIG. 6. Within the skin 32 a sheet of smart material 30 is located both at the upper side and/or lower side of the airfoil. The sheet of smart material 30 can actively control the movement of the trailing edge region by applying a voltage to it. The sheet of smart material 30 may also act as a reinforcement of the skin 32.

Figure 8:
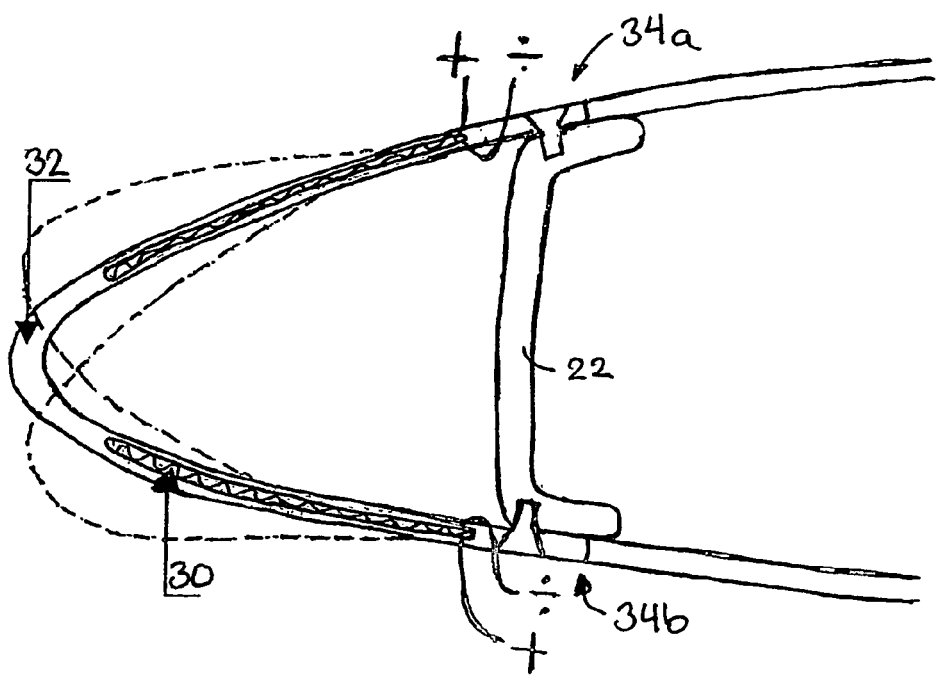
FIG. 8 shows a cross sectional view of an airfoil leading edge region according to preferred embodiments of the present invention.
Figure 9:
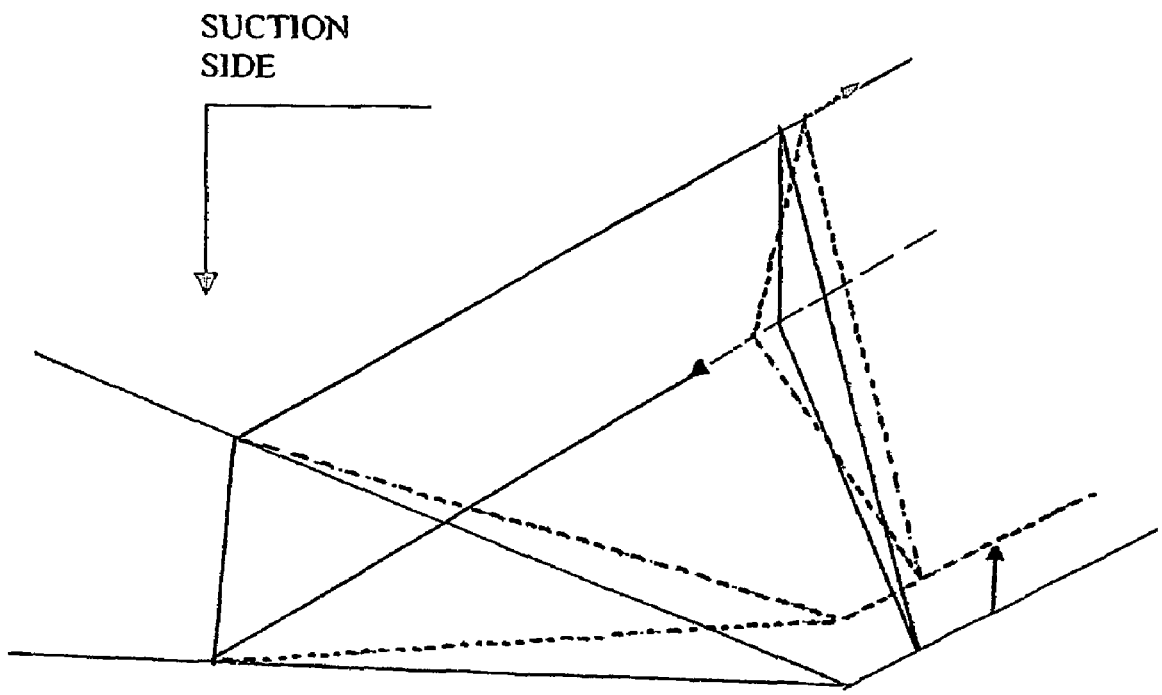
FIG. 9 shows a cross sectional view of an airfoil leading edge region according to preferred embodiments of the present invention: passive control of the movement by the blade deflection. The small-dotted lines show the trailing edge region in a deflected condition.

In FIG. 8 a cross sectional view of an airfoil leading edge region is shown. The leading edge region is structural similar to the trailing edge region disclosed in FIG. 7. Thus, the skin of the leading edge region is made of rubber or the like and within the skin one or more sheets of smart material that can actively control the movement of the leading edge region are situated at the upper and/or lower side of the airfoil.

As it appears e.g. from FIG. 8, the skin 32 is at position 34a and 34b (FIG. 8) attached to the construction 22 typically by a combination of gluing and bolting. The construction 22 defines at these positions abutment surfaces so that once the skin is attached to the construction the transitions when viewed in circumferential direction from skin 32 to the outer surface of the non-deformable part 14 are smooth. The attachment of the skin to these abutment surfaces is so that during deformation of the skin 32, the skin will continue abutting the contact surfaces in such a manner that deformations introduced into to the skin will not result in introducing any non-smoothness in the skin in the vicinity of where the skin 32 is attached to the construction 22.

The circumferential extension of smart material is preferably restricted so that no smart material is present in the vicinity of where the skin 32 is attached to the construction 22. Furthermore, it is preferred to use separate sheets of smart material 30 for the upper and lower parts of e.g. the leading and/or the trailing edge region in order to be able to control deformation of the upper and lower side of the airfoil independently from each other.

The smart material is above disclosed as a sheet of material being sandwiched or embedded in the skin. However, the smart material may also be a sheet material applied to the interior and/or exterior surface of the skin. In both situations the smart material is attached to/within the material of the skin in such a manner that no slip occurs between the smart material and the skin of the material during deformation of the surface of the airfoil.

It is envisaged, that the embodiments shown in FIG. 7 and 8 may instead of being controlled by smart material extending within the skin be provided with a smart material beam or a piston similar to the embodiments of FIGS. 5 and 6.

In order to increase the stability, for instance, of the deformable sections, such as the leading edge region and trailing edge region, the voids within the deformable sections defined by the skin 32 or the voids 20 may be occupied by a supporting material, such as foam made by plastic or rubber. In this way the skin's ability to take up the pressure forces acting thereon may be increase while at the same time allowing the deformations induced by the smart material and/or the piston arrangement.

Deformation of the deformable sections of the airfoil is controlled by utilising a control system comprising a computer system receiving input from sensors arranged on components of the wind turbine and providing in response to the input, control signals to the actuators, e.g. the smart material 24 or the piston assembly 28 to effectuate a deformation in shape. The effectuation is preferably almost instantaneously resulting in an almost instantaneously change in the aerodynamic forces. By instantaneous is preferably meant that no delay is deliberately build into the control system, and that delay in effectuating a deformation results from e.g. material's time constants, transmission delays or the like.

By simulation models for airfoil flow it is possible to compute the lift force and the drag force for a given inflow condition (within the meaning of inflow conditions are preferably considered to be the magnitude of the inflow velocity vector and the angle from the inflow velocity vector to the airfoil chord line also called the angle of attack, but other measures may advantageously be used by the simulation models). Now for an airfoil with variable geometry airfoil the same calculation of lift and drag at the same inflow conditions can be made for small steps in geometry changes from one outer extreme geometry to the opposite extreme geometry. Next the calculations are made from a number of different inflow conditions which means a number of different angle of attacks. In this way a table is made of lift and drag for different angle of attack and different steps of geometry changes.

In a final control loop on an operating turbine the control system will at each time step calculate if an increase or a decrease in aerodynamic load is needed and by use of the above table the corresponding change in geometry is decided.

REFERENCES

[1] Mikhail, A. S. and Christensen, L. S. "*The ZOND 550 kW Z-40 wind turbine development status and test results*". In Proceedings of "Wind Energy 1995" held in Houston, Tex. Jan. 29- Feb. 1, 1995.
[2] Miller, L. S., Migliore P. M. and Quandt, G. A. "*An Evaluation of several wind turbine trailing-edge aerodynamic brakes*". In Proceedings of "Wind Energy 1995" held in Houston, Tex. Jan. 29- Feb. 1, 1995.
[3] Yen, D.T., van Dam, C. P., Smith, R. L., Collins, S. D., '*Active Load Control for Wind Turbine Blades Using MEM Translational Tabs*', Proc. 2001 ASME Wind Energy Symposium, $39^{th}$ AIAA Aerospace Sciences Meeting and Exhibit, Reno, Nev., 11-14 Jan. 2001, p.114-122.
[4] Levin, O., Shyy, W., '*Optimization of a Flexible Low Reynolds Number Airfoil*', AIAA 2001-0125, $39^{th}$ Aerospace Sciences Meeting & Exhibit, 8-11 Jan. 2001, Reno, Nev.
[5] Murri, D. G., Jordan, F. L., '*Wind-Tunnel Investigation of a Full-Scale General Aviation Airplane Equipeed With an Advanced Natural Laminar Flow Wing*', NASA Technical Paper 2772, November 1987
WO200198654-A1 "Wind turbine rotor blade includes flap comprising laminate(s) with layers of materials having differing expansion coefficients". LM Glasfiber A/S
U.S. Pat. No. 5224826-A "Piezoelectric helicopter blade flap actuator—with electrically deformable material mounted within aerofoil, cantilevered to spar to cause flap deflection". Massachusetts Inst. Of Technology.
WO0114740 "Modified wind turbine airfoil", Risø National Laboratory

The invention claimed is:

1. A wind turbine blade comprising:
   one or more shape deformable airfoil sections, wherein an outer surface of each of the shape deformable airfoil sections is substantially continuous in all of its shapes, wherein each shape deformable airfoil section comprises a substantially non-deformable part and one or more deformable parts, and actuator means for providing shape changes in the shape deformable airfoil sections, wherein the actuator means are(is) active means which provide(s) changes in shape by supplying said means with energy, wherein an outer surface of at least one of the deformable parts is defined by skin made of a flexible material, wherein the said skin is attached to the substantially non-deformable part, and wherein the actuator means is situated within the skin, or wherein at least one of the shape deformable parts is made of flexible material(s), wherein the actuator means is(are) an extendable beam(s) extending within the flexible material(s), and the extendable beam(s) is(are) made from a material composition(s) which elongation(s), shortening(s) and/or bending(s) is (are) controllable by applied electrical current(s).

2. A wind turbine blade according to claim 1, wherein at least one of the deformable parts is a shell construction in which the skin defines the shell.

3. A wind turbine blade according to claim 2, wherein the interior of the shell construction is occupied by a deformable supporting material.

4. A wind turbine blade according to claim 3, wherein the deformable supporting material is foam made of plastic or rubber.

5. A wind turbine blade according to claims 1, wherein the transition between the outer surface of the substantially non-deformable part and the skin of the deformable parts is substantially smooth.

6. A wind turbine blade according to claim 1, wherein the non-deformable part comprises abutment surfaces on which the skin abuts, the abutment surfaces being shaped so that the transition between the outer surface of the substantially non-deformable part and the skin is substantially smooth.

7. A wind turbine blade according to claim 1, wherein the actuator means is(are) material composition(s) which elongation(s), shortening(s) and/or bending(s) is(are) controllable by applied electrical current(s).

8. A wind turbine blade according to claim 7, wherein the material composition is sandwiched or embedded in the skin, in such a manner that no slip between the material composition and the material of the skin occurs during deformation of the skin.

9. A wind turbine blade according to claim 1, wherein the at least one deformable part is made solely of flexible material(s) and has one or more voids.

10. A wind turbine blade according to claim 1, wherein the substantially non-deformable part is a central part of the blade and wherein the one or more deformable parts are the leading edge region and/or the trailing edge region.

11. A wind turbine blade according to claim 1, wherein the substantially non-deformable part is a load carrying part.

12. A wind turbine having one or more wind turbine blades according to claim 1.

13. A method of controlling operation condition(s) of a wind turbine comprising one or more blades each having one or more shape deformable airfoil sections; each or some of the shape deformable airfoil section(s) comprise(s) one or more of the features according to claim 1, said operation condition(s) being preferably the load on the blade(s), the power produced by the wind turbine, air induced noise, the stability of the wind turbine and/or the like; said method comprises controlling the shape of the shape deformable airfoil sections, wherein the changes in shape are performed so that no discontinuities are introduced in the surfaces of the airfoil sections.

14. A method according to claim 13, wherein a typical time scale for a deformation to be introduced in the deformable airfoil sections, is lower than the time for one rotor rotation.

15. A method accordingly to claim 14, wherein the typical time scale for deformation is lower than one quarter of the time for one rotation.

16. A method according to claim 13, further comprising the step of setting and/or altering the full span pitch of each blade.

17. A wind turbine blade comprising:
a non-deformable part;
a deformable part connected to the non-deformable part;
a skin comprising flexible material; and
a sheet of smart material,
wherein the skin forms an outer layer of the deformable part,
wherein the sheet of smart material is located within the skin and is configured to receive control signals and thereby control movement of the deformable part based on the received control signals, and
wherein the connection between the non-deformable part and the deformable part is substantially continuous.

18. A wind turbine blade comprising:
a non-deformable part;
a deformable part comprising flexible material and connected to the non-deformable part; and
a beam comprising smart material,
wherein the beam is attached to the non-deformable part and extends into the deformable part, said beam configured to receive control signals and thereby control movement of the deformable part based on the received control signals;
wherein the deformable part comprises one or more voids.

* * * * *

UNITED STATES PATENT AND TRADEMARK OFFICE
CERTIFICATE OF CORRECTION

| | |
|---|---|
| PATENT NO. | : 7,632,068 B2 |
| APPLICATION NO. | : 10/551406 |
| DATED | : December 15, 2009 |
| INVENTOR(S) | : Bak et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this

Second Day of November, 2010

David J. Kappos
*Director of the United States Patent and Trademark Office*